(12) United States Patent
Lubbers et al.

(10) Patent No.: US 8,046,469 B2
(45) Date of Patent: Oct. 25, 2011

(54) SYSTEM AND METHOD FOR INTERFACING WITH VIRTUAL STORAGE

(75) Inventors: Clark E. Lubbers, Colorado Springs, CO (US); Keith D. Woestehoff, Monument, CO (US); Masami Y. Hua, Colorado Springs, CO (US); Richard P. Helliwell, Colorado Springs, CO (US); Randy L. Roberson, New Port Richey, FL (US); Robert G. Bean, Monument, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3383 days.

(21) Appl. No.: 10/043,924

(22) Filed: Oct. 22, 2001

(65) Prior Publication Data

US 2003/0079014 A1    Apr. 24, 2003

(51) Int. Cl.
    *G06F 15/16*    (2006.01)
    *G06F 15/173*   (2006.01)
(52) U.S. Cl. .................. 709/227; 709/223; 709/226
(58) Field of Classification Search .................. None
    See application file for complete search history.

(56) References Cited

U.S. PATENT DOCUMENTS

| | | | |
|---|---|---|---|
| 5,109,318 A | 4/1992 | Funari et al. | |
| 5,184,281 A | 2/1993 | Samarov et al. | |
| 5,513,314 A | 4/1996 | Kandasamy et al. | |
| 5,815,371 A | 9/1998 | Jeffries et al. | |
| 5,815,649 A | 9/1998 | Utter et al. | |
| 5,822,777 A | 10/1998 | Leshem et al. | |
| 5,832,222 A | 11/1998 | Dziadosz et al. | |
| 5,835,700 A | 11/1998 | Carbonneau et al. | |
| 5,987,622 A | 11/1999 | Lo Verso et al. | |
| 5,996,089 A | 11/1999 | Mann et al. | |
| 6,038,689 A | 3/2000 | Schmidt et al. | |
| 6,073,209 A | 6/2000 | Bergsten | |
| 6,148,414 A | 11/2000 | Brown et al. | |
| 6,188,973 B1 | 2/2001 | Martinez et al. | |
| 6,237,112 B1 | 5/2001 | Yoo et al. | |
| 6,243,790 B1 | 6/2001 | Yorimitsu | |
| 6,260,120 B1 | 7/2001 | Blumenau et al. | |
| 6,266,721 B1 | 7/2001 | Sheikh et al. | |
| 6,278,609 B1 | 8/2001 | Suzuki et al. | |
| 6,282,094 B1 | 8/2001 | Lo et al. | |
| 6,282,096 B1 | 8/2001 | Lo et al. | |
| 6,282,610 B1 | 8/2001 | Bergsten | |
| 6,538,669 B1 * | 3/2003 | Lagueux et al. | ............... 715/764 |

OTHER PUBLICATIONS

Smart Storage Inc., "SmartStor InfiNet™: Virtual Storage for Today's E-economy," Sep. 2000.
Compaq Computer Corporation, "The Compaq Enterprise Network Storage Architecture: An Overview," May 2000.
Compaq Computer Corporation, "Compaq Storage Works" Data Replication Manager HSG80 ACS V8.5P Operations Guide, Mar. 2000.

* cited by examiner

*Primary Examiner* — Karen Tang

(57) ABSTRACT

A management interface for a virtualized storage system including a virtualized logical disk object representing a virtual storage container, wherein the logical disk is an abstract representation of physical storage capacity provided by plurality of physical stores. A virtual disk object represents a virtual storage container. The virtual disk object is an abstract representation of one or more logical disk objects, the virtual disk object including an exposed management interface. Wherein the virtual disk object is managed through the management interface to select the one or more logical disk objects represented by the virtual disk object.

17 Claims, 6 Drawing Sheets

SYSTEM AND METHOD FOR INTERFACING WITH VIRTUAL STORAGE

BACKGROUND OF THE INVENTION

1. Field of the Invention

The present invention relates, in general, to mass data storage, and, more particularly, to software, systems and methods for accessing and managing virtualized data storage.

2. Relevant Background

Recent years have seen a proliferation of computers and storage subsystems. Demand for storage capacity grows by over seventy-five percent each year. Early computer systems relied heavily on direct-attached storage (DAS) consisting of one or more disk drives coupled to a system bus. More recently, network-attached storage (NAS) and storage area network (SAN) technology are used to provide storage with greater capacity, higher reliability, and higher availability. The present invention is directed primarily at NAS and SAN systems, collectively referred to as network storage systems, that are designed to provide shared data storage that is beyond the ability of a single host computer to efficiently manage.

To this end, mass data storage systems are implemented in networks or fabrics that provide means for communicating data with the storage systems. Host computers or servers are coupled to the network and configured with several disk drives that cumulatively provide more storage capacity or different storage functions (e.g., data protection) than could be implemented by a DAS system. For example, a server dedicated to data storage can provide various degrees of redundancy and mirroring to improve access performance, availability and reliability of stored data. A large storage system can be formed by collecting storage subsystems, where each sub-system is managed by a separate server.

However, because the physical storage disks are ultimately managed by particular servers to which they are directly attached, many of the limitations of DAS are ultimately present in conventional network storage systems. Specifically, a server has limits on how many drives it can manage as well as limits on the rate at which data can be read from and written to the physical disks that it manages. Accordingly, server-managed network storage provides distinct advantages over DAS, but continues to limit the flexibility and impose high management costs on mass storage implementation.

Some solutions provide a centralized control system that implemented management services in a dedicated server. The management services could then span across various subsystems in the network storage system. However, centralized control creates bottlenecks and vulnerability to failure of the control mechanism. Accordingly, a need exists for a storage system management mechanism that enables storage management from arbitrary points within the storage system. Further, a need exists for storage management systems that implement management processes in a manner that is both distributed, yet capable of managing across multiple subsystems in a network storage system.

A significant difficulty in providing storage is not in providing the quantity of storage, but in providing that storage capacity in a manner than enables ready, reliable access with simple interfaces. Large capacity, high availability, and high reliability storage architectures typically involve complex topologies of physical storage devices and controllers. By "large capacity" it is meant storage systems having greater capacity than a single mass storage device. High reliability and high availability storage systems refer to systems that spread data across multiple physical storage systems to ameliorate risk of data loss in the event of one or more physical storage failures. Both large capacity and high availability/high reliability systems are implemented, for example, by RAID (redundant array of independent drive) systems.

Storage management tasks, which often fall on an information technology (IT) staff, often extend across multiple systems, multiple rooms within a site, and multiple sites. This physical distribution and interconnection of servers and storage subsystems is complex and expensive to deploy, maintain and manage. Essential tasks such as adding capacity, removing capacity, as well as backing up and restoring data are often difficult and leave the computer system vulnerable to lengthy outages. Moreover, configuring and applying data protection, such as RAID protection, to storage is complex and cannot be readily changed once configured.

Storage virtualization generally refers to systems that provide transparent abstraction of storage at the block level. In essence, virtualization separates out logical data access from physical data access, allowing users to create virtual disks from pools of storage that are allocated to network-coupled hosts as logical storage when needed. Virtual storage eliminates the physical one-to-one relationship between servers and storage devices. The physical disk devices and distribution of storage capacity become transparent to servers and applications.

Virtualization can be implemented at various levels within a SAN environment. These levels can be used together or independently to maximize the benefits to users. At the server level, virtualization can be implemented through software residing on the server that causes the server to behave as if it is in communication with a device type even though it is actually communicating with a virtual disk. Server-based virtualization has limited interoperability with hardware or software components. As an example of server-based storage virtualization, Compaq offers the Compaq SANworks™ Virtual Replicator.

Compaq VersaStor™ technology is an example of fabric-level virtualization. In Fabric-level virtualization, a virtualizing controller is coupled to the SAN fabric such that storage requests made by any host are handled by the controller. The controller maps requests to physical devices coupled to the fabric. Virtualization at the fabric level has advantages of greater interoperability, but is, by itself, an incomplete solution for virtualized storage. The virtualizing controller must continue to deal with the physical storage resources at a drive level.

Copending U.S. patent application Ser. No. 10/040,194, filed on even date herewith and assigned to the assignee of the present invention is incorporated herein by reference. This application describes a system-level storage virtualization system that implements highly fluid techniques for binding virtual address space to physical storage capacity. This level of virtualization creates new difficulties in storage management.

Interfaces to storage management systems reflect this complexity. From a user perspective, application and operating software express requests for storage access in terms of logical block addresses (LBAs). The software and operating system requests, however, are not valid for the individual physical drives that make up network storage system. A controller receives the requests and translates them to disk commands expressed in terms of addresses that are valid on the disk drives themselves. The user interface implemented by prior network storage controllers implemented this logical-to-physical mapping, and so required knowledge of the physical disks that make up the storage system. As physical disks were added to, removed from, failed, or otherwise became inaccessible, the logical-to-physical mapping had to be updated to reflect the changes. A need exists, therefore, for a management system for a truly virtualized mass storage systems in which a user interfaces only to virtual entities and is isolated from the underlying physical storage implementation.

SUMMARY OF THE INVENTION

Briefly stated, the present invention involves a management interface for a virtualized storage system including a virtualized logical disk object representing a virtual storage container, wherein the logical disk is an abstract representation of physical storage capacity provided by plurality of physical stores. A virtual disk object represents a virtual storage container. The virtual disk object is an abstract representation of one or more logical disk objects, the virtual disk object including an exposed management interface. Wherein the virtual disk object is managed through the management interface to select the one or more logical disk objects represented by the virtual disk object.

DETAILED DESCRIPTION OF THE PREFERRED EMBODIMENTS

The present invention generally involves a storage management system for a virtualized data storage system. A storage management system comprises the software, firmware, and hardware mechanisms that implement an interface that enables a user to organize and present virtual disks to a host computing system that uses the presented storage capacity. One feature of the management system in accordance with the present invention is that it creates these virtual disks from logical disks rather than from physical disks as was done by previous systems. The logical disks are themselves a virtualization of physical storage capacity (e.g., disk drives). In this manner, the storage management interface in accordance with the present invention enables interaction in a way that is truly independent of the physical storage implementation.

In the examples used herein, the computing systems that require storage are referred to as hosts. In a typical implementation, a host is any computing system that consumes vast quantities of data storage capacity on its own behalf, or on behalf of systems coupled to the host. For example, a host may be a supercomputer processing large databases, a transaction processing server maintaining transaction records, and the like. Alternatively, the host may be a file server on a local area network (LAN) or wide area network (WAN) that provides mass storage services for an enterprise. In the past, such a host would be outfitted with one or more disk controllers or RAID controllers that would be configured to manage multiple directly attached disk drives. The host connects to the virtualized SAN in accordance with the present invention with a high-speed connection technology such as a fibre channel (FC) fabric in the particular examples. Although the host and the connection between the host and the SAN are important components of the entire system, neither the host nor the FC fabric are considered components of the SAN itself.

The present invention implements a SAN architecture comprising a group of storage cells, where each storage cell comprises a pool of storage devices called a disk group. Each storage cell comprises parallel storage controllers coupled to the disk group. The storage controllers coupled to the storage devices using a fibre channel arbitrated loop connection, or through a network such as a fibre channel fabric or the like. The storage controllers are also coupled to each other through point-to-point connections to enable them to cooperatively manage the presentation of storage capacity to computers using the storage capacity.

The present invention is illustrated and described in terms of a distributed computing environment such as an enterprise computing system using a private SAN. However, an important feature of the present invention is that it is readily scaled upwardly and downwardly to meet the needs of a particular application.

Figure 1:
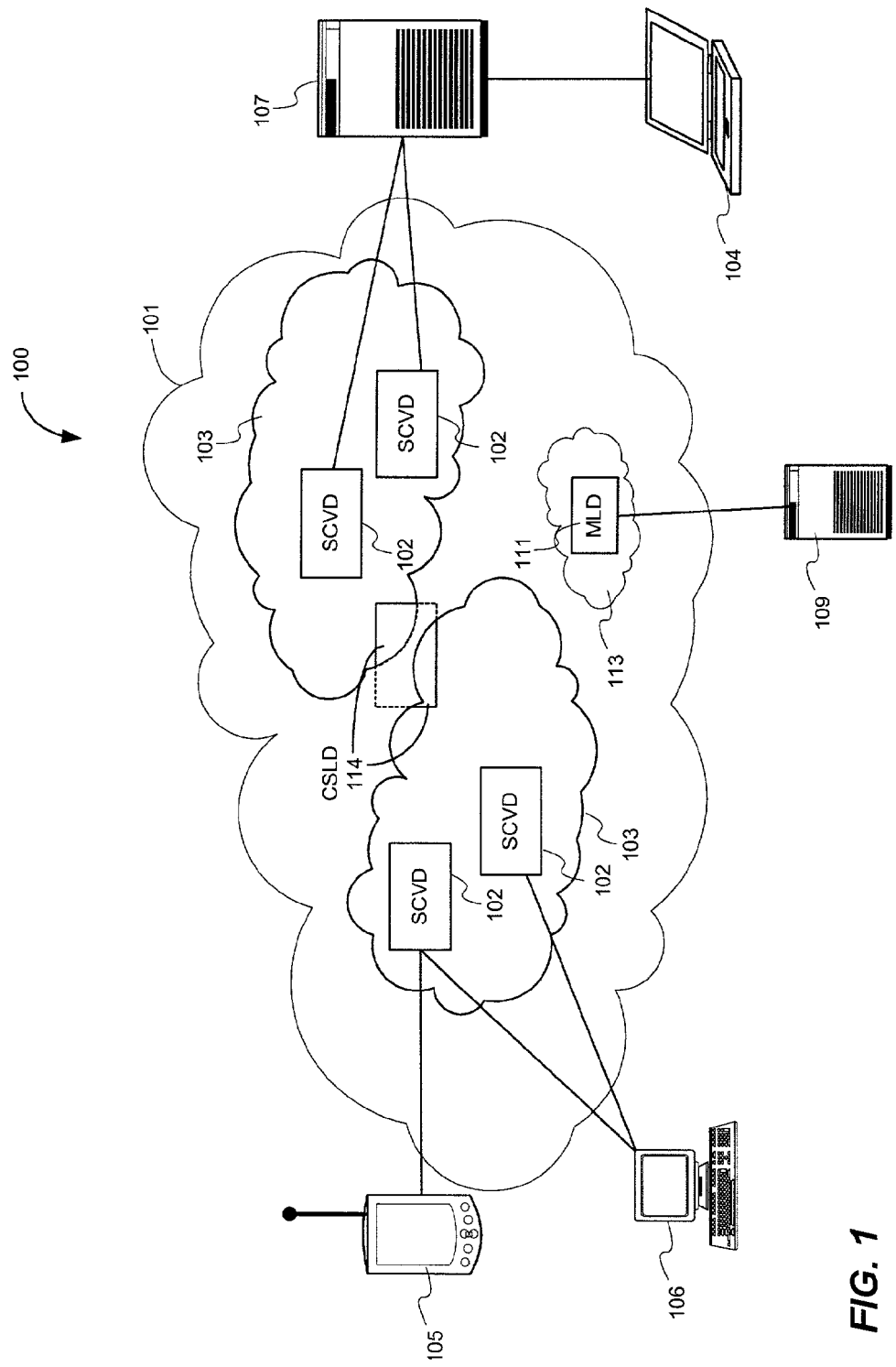
FIG. 1 shows a logical view of a networked computer environment in which the virtualized storage system in accordance with the present invention is implemented.

FIG. 1 shows a logical view of an exemplary SAN environment 100 in which the present invention may be implemented. Environment 100 shows a storage pool 101 comprising an arbitrarily large quantity of storage space from which logical disks (also called logical units or virtual disks) 102 are allocated. In practice, storage pool 101 will have some finite boundaries determined by a particular hardware implementation, however, there are few theoretical limits to the size of a storage pool 101.

Within pool 101 logical device allocation domains (LDADs) 103 are defined. LDADs correspond to a set of physical storage devices from which virtual disks 102 may be allocated. Virtual disks 102 do not span LDADs 103 in the preferred implementations. Any number of LDADs 103 may be defined for a particular implementation as the LDADs 103 operate substantially independently from each other. Virtual disks 102 have a unique identification within each LDAD 103 that is assigned upon creation of a virtual disk 102. Each virtual disk 102 is essential a contiguous range of logical addresses that can be addressed by host devices 105, 106, 107 and 109 by mapping requests from the connection protocol used by the hosts to the uniquely identified virtual disk 102.

Some hosts such as host 107 will provide services of any type to other computing or data processing systems. Devices such as client 104 may access virtual disks 102 via a host such as server 107 to which they are coupled through a LAN, WAN, or the like. Server 107 might provide file services to network-connected clients, transaction processing services for a bank automated teller network, telephone call processing services and the like. Hence, client devices 104 may or may not directly use the storage consumed by host 107. It is also contemplated that devices such as computer 106 and wireless device 105, which are also hosts, may logically couple directly to virtual disks 102.

A SAN manager appliance 109 is coupled to a management logical disks (MLD) 111 which is a metadata container describing the logical structures used to create virtual disks 102, LDADs 103, and other logical structures used by the system. A portion of the physical storage capacity available in storage pool 101 is reserved as quorum space 113 and cannot be allocated to LDADs 103, hence cannot be used to implement virtual disks 102. In a particular example, each physical disk that participates in storage pool 101 has a reserved amount of capacity (e.g., the first "n" physical sectors) that are designated as quorum space 113. MLD 111 is mirrored in this quorum space of multiple physical drives and so can be accessed even if a drive fails. In a particular example, at least one physical drive is associated with each LDAD 103 includes a copy of MLD 111 (designated a "quorum drive"). SAN management appliance 109 may wish to associate information such as name strings for LDADs 103 and virtual disks 102, and timestamps for object birthdates. To facilitate this behavior, the management agent uses MLD 111 to store this information as metadata. MLD 111 is created implicitly upon creation of each LDAD 103.

Quorum space 113 is used to store information including physical store ID (a unique ID for each physical drive), version control information, type (quorum/nonquorum), RSS ID (identifies to which RSS this disk belongs), RSS Offset (identifies this disk's relative position in the RSS), Storage Cell ID (identifies to which storage cell this disk belongs), PSEG size, as well as state information indicating whether the disk is a quorum disk, for example. This metadata PSEG also contains a PSEG free list for the entire physical store, probably in the form of an allocation bitmap. Additionally, quorum space 113 contains the PSEG allocation records (PSARs) for every PSEG on the physical disk. The PSAR comprises a PSAR signature, Metadata version, PSAR usage, and an indication a RSD to which this PSEG belongs.

CSLD 114 is another type of metadata container comprising logical drives that are allocated out of address space within each LDAD 103, but that, unlike virtual disks 102, span multiple LDADs 103. Preferably, each LDAD 103 includes space allocated to CSLD 114. CSLD 114 holds metadata describing the logical structure of a given LDAD 103, including a primary logical disk metadata container (PLDMC) that contains an array of descriptors (called RSDMs) that describe every RStore used by each virtual disk 102 implemented within the LDAD 103. The CSLD 111 implements metadata that is regularly used for tasks such as disk creation, leveling, RSS merging, RSS splitting, and regeneration. This metadata includes state information for each physical disk that indicates whether the physical disk is "Normal" (i.e., operating as expected), "Missing" (i.e., unavailable), "Merging" (i.e., a missing drive that has reappeared and must be normalized before use), "Replace" (i.e., the drive is marked for removal and data must be copied to a distributed spare), and "Regen" (i.e., the drive is unavailable and requires regeneration of its data to a distributed spare).

In accordance with the present invention, the storage capacity is virtualized at a very low level, preferably at a level that is not normally accessible to the management interface. In practice, storage capacity is allocated to logical devices or logical units (LUNs) or virtual disks which are the most primitive or basic container presented to the storage management system. The mechanisms that map LUNs to physical resources occur within the storage controller(s) themselves. Storage users configure virtual drives using the available LUNs, not physical drives as in prior approaches. LUNs may comprise parts of different physical drives, a single physical drive, or multiple physical drives to meet the needs of a particular application, and without impacting the operation of the overlying management processes.

Each of the devices shown in FIG. 1 may include memory, mass storage, and a degree of data processing capability sufficient to manage a network connection. The computer program devices in accordance with the present invention are implemented in the memory of the various devices shown in FIG. 1 and enabled by the data processing capability of the devices shown in FIG. 1.

To understand the scale of the present invention, it is contemplated that an individual LDAD 103 may correspond to from as few as four disk drives to as many as several thousand disk drives. In particular examples, a minimum of eight drives per LDAD is required to support RAID-1 within the LDAD 103 using four paired disks. virtual disks 102 defined within an LDAD 103 may represent a few megabytes of storage or less, up to 2 TByte of storage or more. Hence, hundreds or thousands of virtual disks 102 may be defined within a given LDAD 103, and thus serve a large number of storage needs.

Figure 2:
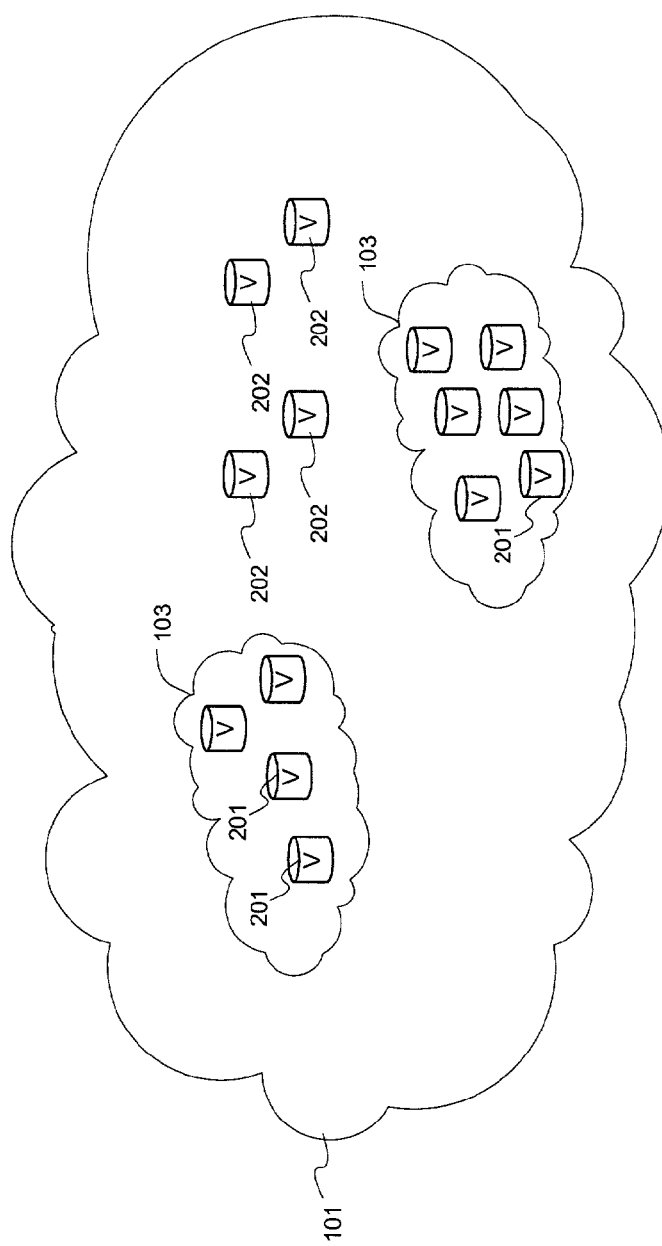
FIG. 2 illustrates a logical representation of a storage pool.

FIG. 2 shows a logical view of constituents of a storage pool 101. Physical storage capacity is represented as a plurality of volumes 201 and 202. Volumes 201 and 202 are themselves abstractions of physical disk drives in that a volume comprises metadata that describes storage capacity on a physical disk drive. A volume will indicate, for example, the quantity of storage provided by a particular physical disk drive as well as other metadata described hereinafter.

This abstraction enables volumes 201 or 202 to present storage capacity in arbitrary units called physical segments (PSEGs). In contrast, a physical disk drive presents its capacity in terms of number of sectors or device-specified logical block addresses. Volumes 201 represent physical storage capacity that has been allocated to a particular LDAD 103. Volumes 202 represent physical storage capacity that exists in storage pool 101, but have not been added to an LDAD 103. In a particular embodiment, virtual disks 102 can only be configured from volumes 201, whereas a volume 202 can be added to existing virtual disks 102 by moving the volume 202 into an LDAD 103 (thereby making it a volume 201).

Figure 3:
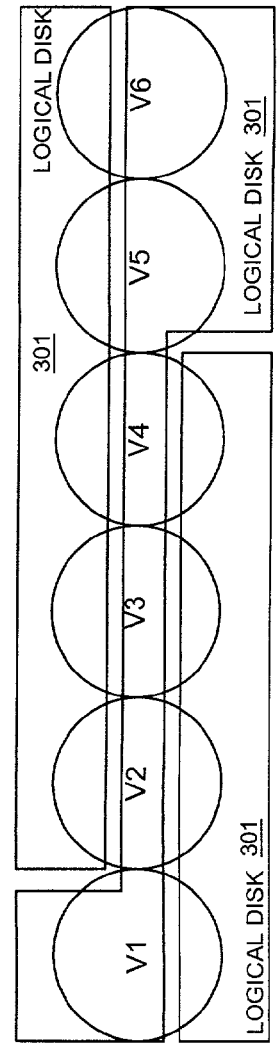
FIG. 3 shows a configuration of logical drives from volumes in accordance with an embodiment of the present invention.

Each virtual disk 102 represents a virtual address space that is available for storing blocks of user data. An virtual disk 102 comprises one or more than one logical drives 301 shown in FIG. 3. In FIG. 3, a set of six volumes labeled V1 through V6, corresponding to six physical disk drives, are used to form three logical drives 301. While it is contemplated that in many cases a set of volumes 201 may actually be configured as a single logical disk 301, the present invention enables the capacity of each volume 201 to be divided and spread out amongst any number of logical drives 301. A logical disk 301 may take an equal number of PSEGs from each volume 201, or may take an unequal number of PSEGs as shown in FIG. 3. The number of volumes 201 used by each logical disk 301 is determined in part by the data protection rules for that logical disk, but a larger number of volumes 201 may be used to improve utilization or performance.

A logical disk 301 comprises one or more redundant stores (RStore) which are the fundamental unit of reliable storage in the system of the present invention. An RStore comprises an ordered set of PSEGs with associated redundancy properties and is contained entirely within a single redundant store set (RSS). By analogy to conventional systems, PSEGs are analogous to physical disk drives and each RSS is analogous to a RAID storage set comprising a plurality of physical disk drives.

An RSS comprises a subset of physical disks in an LDAD 103, such as the set of six volumes shown in FIG. 3. In preferred implementations, an RSS includes from six to eleven physical drives (which can change dynamically), and the physical drives may be of disparate capacities. Physical drives within an RSS are assigned indices (e.g., 0, 1, 2, ..., 11) for mapping purposes. They may be further organized as pairs (i.e., adjacent odd and even indices) for RAID-1 purposes.

Figures 4, 5:
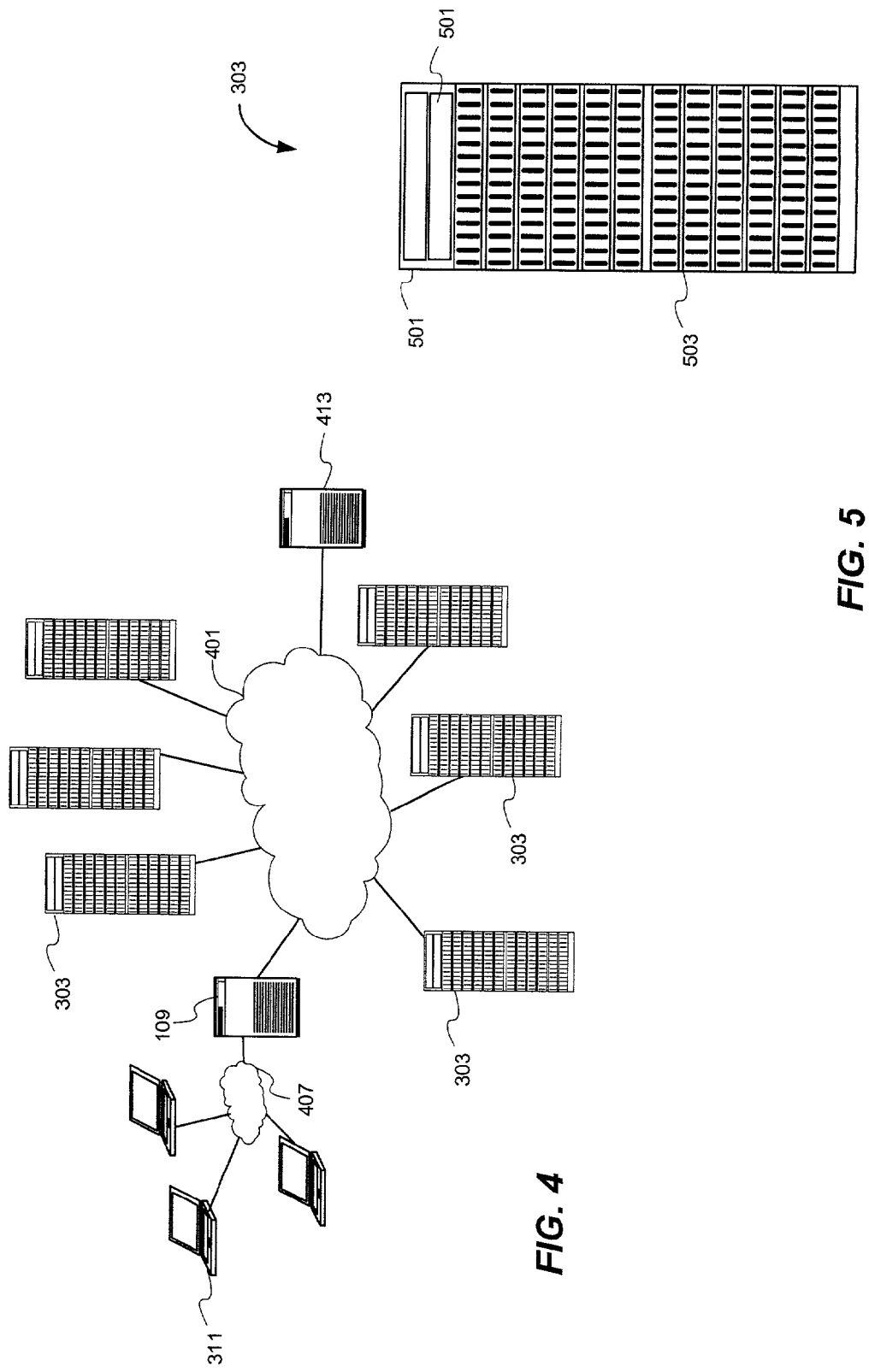
FIG. 4 illustrates a physical view of a networked computer environment in which the virtualized storage system in accordance with the present invention is implemented.
FIG. 5 illustrates a storage cell shown in FIG. 4 in greater detail.

FIG. 4 illustrates a physical implementation of virtualized storage in accordance with the present invention. Network 401, such as a fibre channel fabric, interconnects a plurality of storage cells 403. Storage cells 403 are accessible through fabric 401, or by management appliance 109 through LANs/WANs 407. Storage cells 403 essentially implement a storage pool 101. The number of storage cells that can be included in any SAN is primarily limited by the connectivity implemented by fabric 401. A fabric comprising even a single fibre channel switch can interconnect 256 or more ports, providing a possibility of hundreds of storage cells 403 in a single storage pool 101.

Host 413 includes adapter hardware and software to enable a connection to fabric 401. The connection to fabric 401 may be through an optical coupling or more conventional conductive cabling depending on the bandwidth requirements. A host adapter will often be implemented as a plug-in card on a host computer system. A host 413 may implement any number of host adapters to provide as many connections to fabric 413 as the hardware and software support.

As shown in FIG. 5, each storage cell 403 in the preferred embodiment comprises a pair of network storage controllers (NSCs) 501 coupled by a fibre channel arbitrated loop (FCAL) to a plurality of hard disks located in disk cabinet 503. NSC 501 implements a network interface to receive storage access requests from hosts as well as fibre channel arbitrated loop ports to connect to storage device in cabinet 503. NSCs 501 are coupled together over a high-speed connection such as a fibre channel point-to-point connection. While the particular embodiments are illustrated with fibre channel communication links, any communication protocol and hardware that provides sufficient bandwidth for a particular application may be used, including proprietary hardware and protocols.

Figure 6:
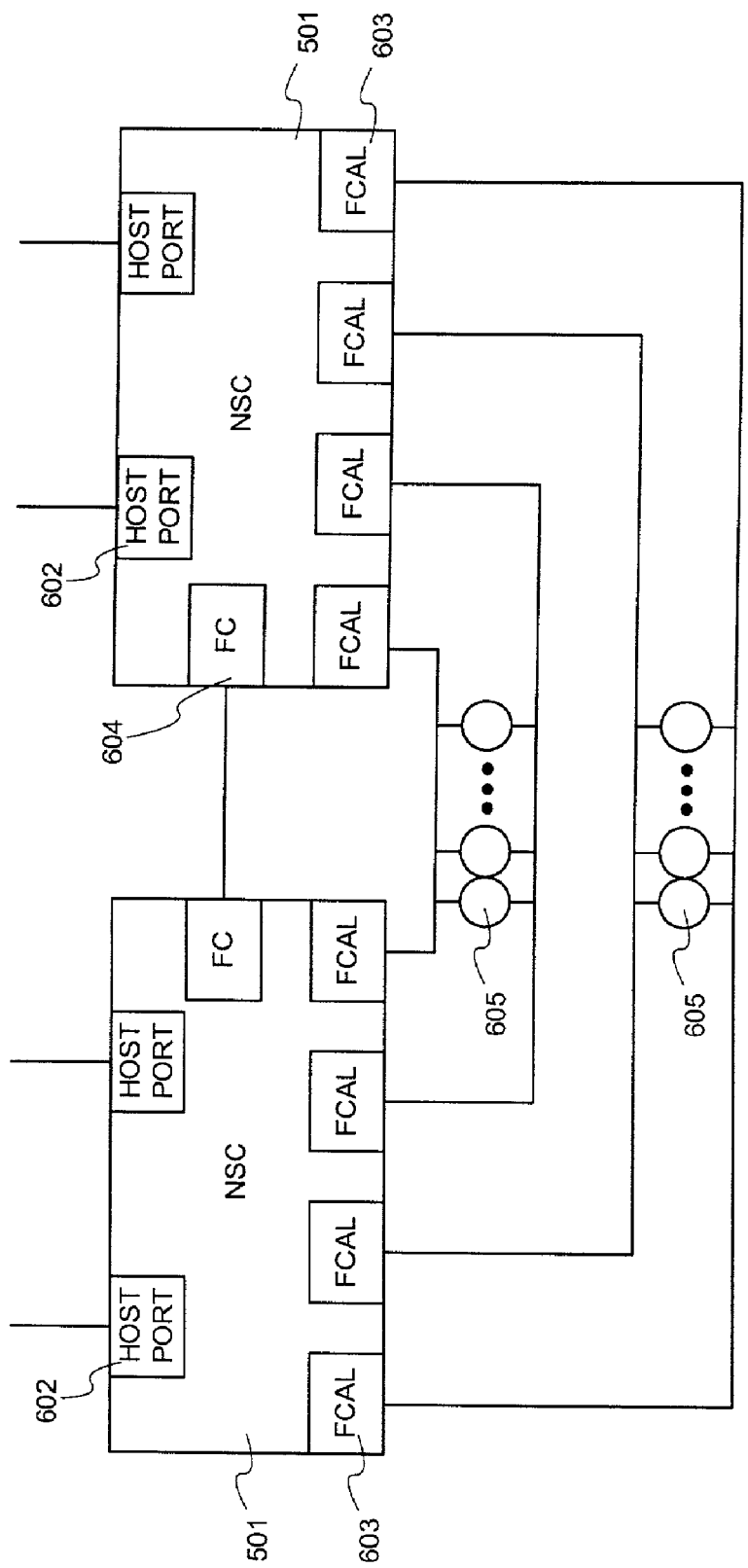
FIG. 6 shows a functional block-diagram of components of an alternative embodiment storage cell.

FIG. 6 illustrates a functional model of a storage cell 403 in greater detail. In the example of FIG. 6, storage cell 403 includes NSCs 501 to provide redundancy. NSCs 501 are implemented microcomputers having a microprocessor and memory, as well as a plurality of fibre channel ports 602, 603 and 604. Host adapter ports 602 provide an interface to fabric 401 (shown in FIG. 5) and are implemented as FC N_Ports in a particular example. Each Host adapter port handles login to fabric 401, and is assigned a fabric-unique port ID in the login process. Dual host port connections on each NSC provide redundancy.

Any number of FCAL ports 603 may be implemented in each NSC 501, although four FCAL ports 603 per NSC 601 are used in the exemplary implementation. FCAL ports 603 are used to connect to drives 605 which comprise fiber channel drives. It should be understood that a variety of configurations are possible. For example, rather than an FCAL configuration, a fibre channel fabric using a switch could be used to couple to drives 605. The particular FCAL implementation shown allows up to 124 drives in each of two FCAL loops (248 drives per storage cell 403), where each loop is accessible by either NSC 501 to provide redundant connectivity. As each drive 605 may implement from 10 GB to 100 GB or more of storage capacity, a single storage cell 403 may implement vast quantities of storage. All of the storage that is accessible through a particular pair of NSCs 603 is considered to be within the storage pool 101 in which LDADs 103 can be implemented. While a SAN may include multiple storage cells 403, each cell 403 essentially implements and independent storage pool 101.

Each disk drive 605 is represented as a plurality of equal-sized physical segments. In a particular example, each physical segment (PSEG) comprises 6096 contiguous sectors, or 2 Mbyte of storage capacity. A 40 Gbyte drive will, therefore, provide 10K PSEGs, whereas an 80 Gbyte drive will provide 80K PSEGS. By decomposing physical drives into uniform-sized atomic units (PSEGs), the system can use PSEGs in a manner akin to how prior systems used drives. Essentially, PSEGs are treated as an atomic unit of storage rather than a physical drive. Because of this, the processes that manipulate data to, for example, implement parity, mirroring, striping, leveling, failure recovery and the like operate on much smaller units (PSEGs) rather than on entire drives as was done in the past. PSEGs are allocated to a particular storage task rather than drives. This atomicity increases the granularity with which the physical storage resources can be applied to a particular task, resulting in an increased flexibility in implementation of a particular virtual disk 102.

Specifically, drives 605 within a given storage cell 403 may vary in capacity as the present invention includes mechanisms that efficiently use all storage capacity. Moreover, drives 605 that are involved in the implementation of a particular virtual disk 102 may vary in capacity while at the same time efficiently using the disk capacity. This allows great flexibility in populating drives 605 so that the most cost and performance efficient drives can be selected at any given time, and storage capacity can grow or shrink incrementally without requiring replacement of drives 605.

Figure 7:
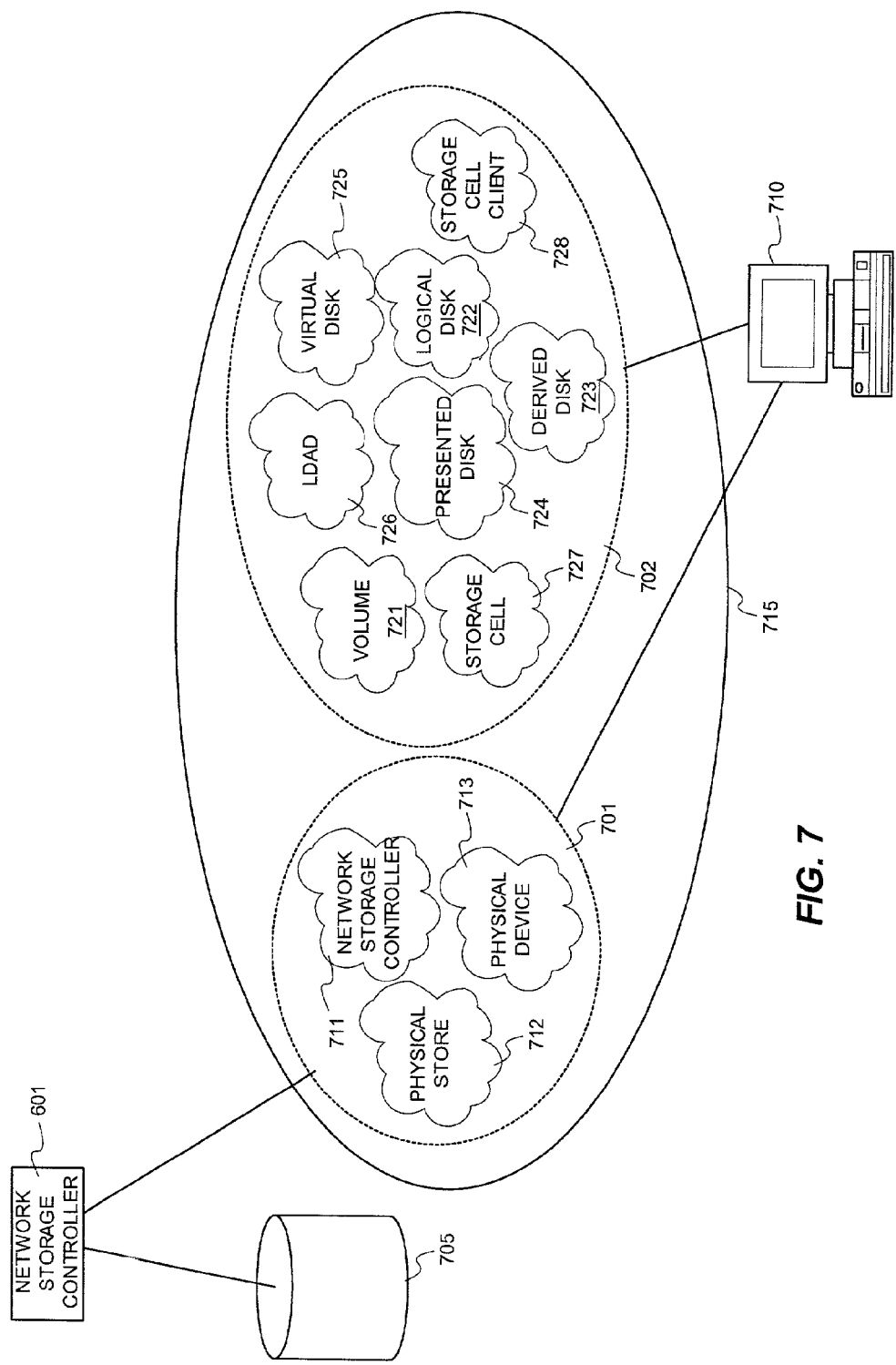
FIG. 7 depicts data structures implementing an object-oriented management model in accordance with the present invention.

FIG. 7 illustrates management relationships between various objects implemented in a management interface in accordance with the present invention. In a preferred implementation, the present invention is implemented using object-oriented programming techniques by defining a set of classes that describe various logical entities that will be implemented (or instantiated) in operation. Classes generically define interfaces for communication, methods describing behavior and variables describing properties pertaining to a particular kind of thing. The instance of a class (or object) includes specific interfaces, methods and variables corresponding to a particular thing that the instantiated object represents.

As shown in FIG. 7, the storage management system in accordance with the present invention is implemented as a collection of persistent objects 701, and logical objects 702 implemented within memory space 715. Persistent objects 701, because they represent tangible hardware, are not normally created and destroyed through the management interface, but instead are managed automatically upon detection of hardware changes. Memory space 715 is memory space within a single computing device such as NSC 601 in a particular example, however, objects 701 and 702 could be implemented in separate computing systems using object-oriented distributed processing methods such as CORBA technology and the like. A network storage controller 501 is responsible for creating and managing persistent objects 701 including a network storage controller object 711, a physical store object 712, and a physical device object 713. Logical objects 702 are managed by a SAN management appliance 710 that implements management agent processes.

Physical store object 712 represents a particular physical disk 605. Physical device object 713 represents a device implemented by one or more physical stores objects 712. A physical device 713 differs from a physical store 712 in that it includes interfaces, methods and variables describing a control interface to the one or more physical stores it contains.

Hence, it is not necessary to define or instantiate a physical device object 713 until it contains at least one physical store 712.

Network storage controller object 711, volume object 721 and physical device object 713, many of which may be instantiated in any given application, represent physical entities and so are preferably maintained persistently in persistent store 705. Persistent objects 701 will exist even during a system shutdown, and in event of a component or communication failure, can be re-instantiated to their state before the failure. Persistent store 705 is not a single data store in most implementations. The persistent knowledge required to maintain objects is stored in metadata objects known only to the storage cell (i.e., NSC 501, as required to meet the needs of a particular application.

NSC object 711 includes attributes and methods that represent the physical state, configuration, and characteristics of a particular NSC 601. This information includes, for example, port identification information used to address the NSC, information indicating where the NSC is physically installed (e.g., a cabinet number, room number, or host computer name) and the like. The methods implemented by NSC object 711 include methods for reading or getting the attributes and setting or writing the attributes. An NSC.login( ) method performs a security check and login for a particular management agent. An NSC.logout( ) method performs logout of the management agent. These security measures make it more difficult for a malicious or malfunctioning entity to use storage resources. A variety of maintenance and diagnostic routines may be implemented within the firmware of an NSC. A method "NSC.maintenance_invoke_routine( )" is used to request the target NSC to execute a particular maintenance routine identified by the arguments. This allows predetermined maintenance routines to be executed remotely. Any results of the routine execution are returned in a response, or the routine may itself generate notifications or messages indicating results.

Physical device object 713 implements methods including a PHYSICAL_DEVICE.get_condition( ) method that returns a value indicating a condition attribute of the target physical device (e.g., normal, degraded, not present, and the like). A PHYSICAL_DEVICE.get_physical_stores( ) method returns a list of handles of the physical store objects 712 that are accessible through the target physical device object 713. A PHYSICAL_DEVICE.get_physical_stores_count( ) method returns the count of physical store handles (i.e., the number of physical store objects 712) that can be accessed through the target physical device object 713. PHYSICAL_DEVICE.get_type( ) returns a type attribute of the target Physical Device. The type attribute indicates, for example, that the physical device is a fibre channel disk or some other type of device.

Physical store object 712 contains attributes that describe the physical characteristics of a disk drive 605 (e.g., capacity status, SCSI and Fibre channel attributes), however, it has some logical information associated with it as well. That logical information is not accessible if no storage cell has been formed or if the storage cell cannot be accessed (e.g. from an NSC 601 that is not participating in the storage cell). In addition to methods for getting and setting attribute values, a physical store object 712 includes methods for indicating the state of a corresponding disk drive (e.g., failed, not failed. In a particular example, a method for indicated a predicted but not yet realized failure is implemented. Other methods enable commands to be sent to and responses received from the corresponding disk drive 605.

Logical objects 702 comprise various objects that represent logical data structures implemented in accordance with the present invention. Logical objects 702 include a volume object 721 that represents physical storage capacity as indicated by the metadata (e.g., PSARs) stored on individual disk drives. Hence, volume objects 721 are derived from physical store objects 712 and physical device objects 713. Volume objects represent a plurality of PSEGs from a particular storage device that are available for data storage, and may include all or only some of the PSEGs on the corresponding disk drive. In a particular example, volume objects define methods for getting and setting attribute values such as values indicating which LDAD 102 the volume belongs to. Other methods allow creation of the volume object 721 as well as destruction (i.e., erasure) of the volume object 721.

A virtual disk is actually conceptual entity that a user sees as the entity storing data and is implemented by an interacting group of logical objects 702. Each of the objects include methods for self-creation and destruction, as well as get and set methods for manipulating various attributes of the particular logical object. Specifically, a storage cell virtual disk 102 comprises logical disk object(s) 722, an SCVD object 725, derived disk object(s) 723, and presented disk object(s) 724. A given LDAD 103 is represented by an LDAD object 726 and each storage cell 403 is represented by a storage cell object 727. Storage cell clients such as a storage server 107 or management agent 710 are represented by instances of storage cell client objects 728.

Each instance of an object 702 includes attribute values that are specific to the entity that is represented including handles for communicating with other objects and attributes that indicate current state of the represented entity. Each instance of an object 702 also includes methods that enable manipulation of the attributes as well as methods that implement behaviors such as reading and writing data or creation/destruction of logical objects 702 including self creation/destruction.

Logical disk objects 722 represent virtualized storage capacity implemented by RSSs that are combined to form a logical disk using PSEGs represented by volume objects 721. Logical disk objects 722 are the fundamental storage unit accessible by the storage management system and are analogous to physical disk drives in prior storage management systems.

In an initial implementation, each virtual disk comprises only one logical disk object 722, although it is contemplated that many logical disk objects 722 could be readily provided. It should be understood, however, that SCVD objects 725 are unique and separate objects from logical disk objects 722 even though there may be a one-to-one relationship between them in many instances.

Logical disk objects 722 include methods for getting and setting attribute values such as allocated capacity, reserved capacity, redundancy type, and object handles. Logical disk objects 722 also include methods that effect creation and destruction of logical disk objects 722. In addition to these management functions, logical disk objects 722 include methods that interact with physical stores 712 and physical devices 713 for reading and writing data to the storage capacity they represent.

Figure 8:
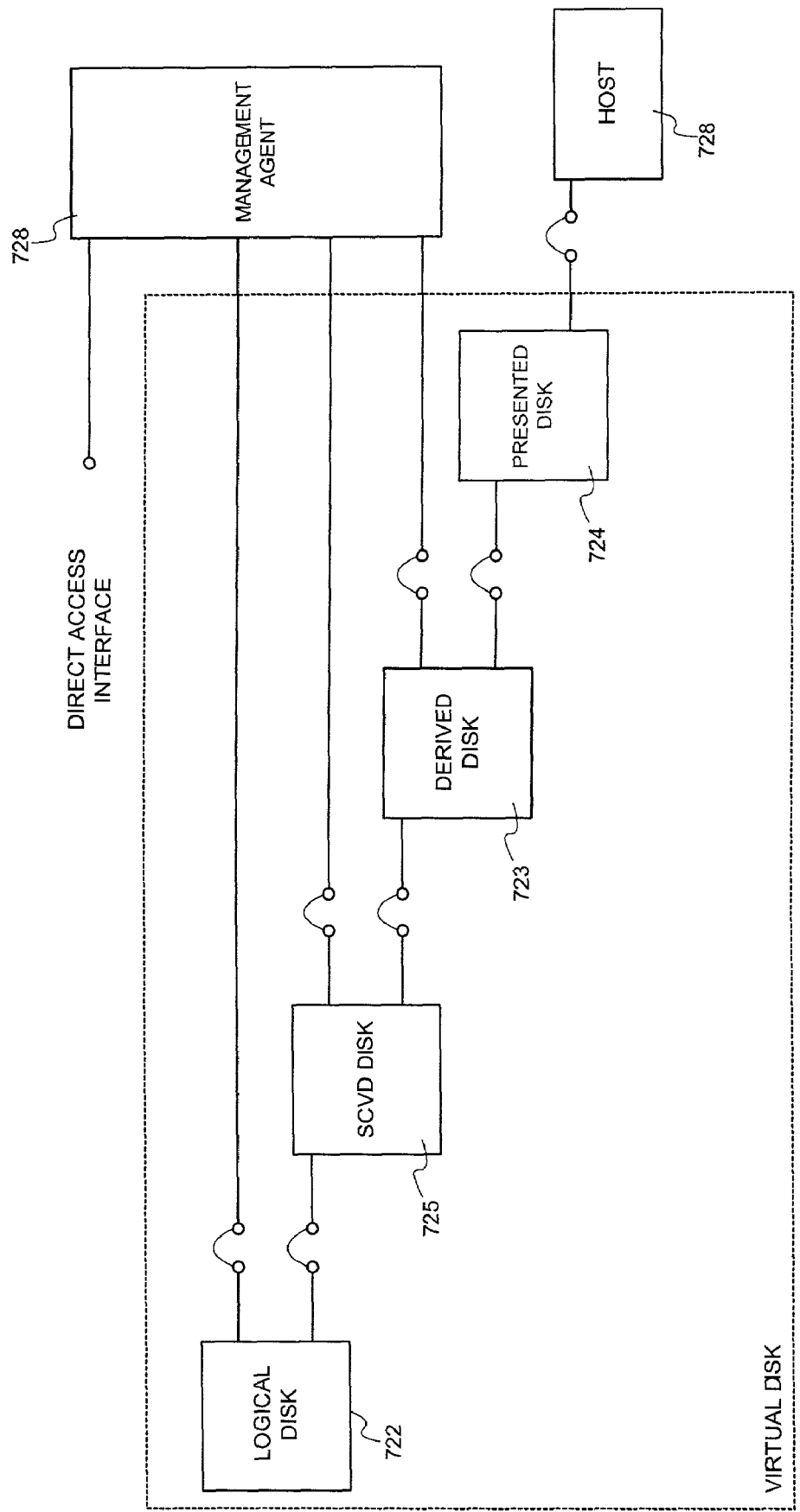
FIG. 8 illustrates interfaces and interactions between object implementing an exemplary client-accessible virtual disk in accordance with the present invention.

The SCVD object 725 adds specified virtual disk performance behaviors such as caching behavior. SCVD object is accessible by management agent host 728, but not directly accessible by users. To be clear, unlike the "virtual disk" which is a conceptual entity and therefore not a logical object that interacts with hosts 728, the SCVD object is a logical object with defined interfaces and behaviors. SCVD object 725 interfaces to derived disk object 723 as indicated in FIG. 8.

The derived disk object 723 adds protocol personality (e.g., EIDE, SCSI, Fiber Channel, CI, etc.) to a block-store represented by a logical disk 722. In other words, the derived unit object 723 supplies the I/O protocol behavior for the virtual disk. When a virtual disk is presented to a host via presented disk object 724, a derived unit is created to add semantics (e.g., SCSI) to the block storage provided by the virtual disk. In the initial implementation only a single derived disk object is provided per virtual disk. If desired, more than one derived disk object 723 can be allowed per virtual disk, such as in cases where an administrator wants to treat the logical disk 722 as independent disks that happen to have shared contents. The logical disk 722 could then be implemented with a SCSI-protocol interface and a separate Fibre-channel protocol interface.

The presented disk object 724 provides an association between a storage cell client object 728 or a group of storage cell client objects 728 and a derived disk 723. This association allows a client represented by the storage cell client object 728 to access a derived disk 723 and its underlying storage capacity. It is preferred that virtual disks be selectively presented to clients so that each client will be able to access a specified set of virtual disks, but not access others. MLDs 111, in contrast, do not require presented disk objects because they are not accessible to clients. A derived disk 723 may be associated with multiple presented disks 724 (e.g., one for each client to which the virtual disk is presented).

The object-oriented management model illustrated in FIG. 7 enables a complete separation of the virtual disk presented to a client and the physical disk drives used to implement the store. Significantly, the physical storage capacity is virtualized by the logical disk object 722 such that a management agent 710 does not manipulate any physical objects when creating or changing characteristics of virtual disks. An exemplary implementation of a virtualization system that supports the creation of logical disks 722 is described in greater detail in co-pending U.S. patent application Ser. No. 10/040,194 filed concurrently herewith entitled "SYSTEM AND METHOD FOR ATOMIZING STORAGE and assigned to the Assignee of the present invention, the disclosure of which is incorporated herein by reference. Because the management tasks are distributed amongst NSCs 601 and management agents 710, management tasks can be performed from anywhere in the network storage system.

Referring to FIG. 8, interfaces between entities shown in FIG. 7 are illustrated for a particular instance of a virtual disk. Some of the various methods within each object define interfaces that enable communication with interfaces of other objects. An interface is exposed when it is made available for use by another object. Hence, most interfaces are exposed for some, but not all objects in the system.

The management object can create instances of logical disk(s) 722, SCVD objects 725, derived disks 723 and presented disk objects 724 and associate these with each other to implement a virtual disk as observed by a user. Each of objects shown in FIG. 7 does not need to expose interfaces directly to storage cell client 728 that represents a host system (e.g., a system that is accessing stored data). Instead, host systems access stored data through an exposed interface of the presented disk object 724. Similarly, logical disk objects 722 and derived disk objects 723 need not expose their interface directly to a storage cell client 728 representing a host. However, each object type includes interfaces exposed to the management agent.

In operation, the mechanisms, software, firmware and data structures of the present invention enable management of virtualized storage with enormous flexibility. Storage capacity is realized and managed in a manner that is essentially independent of the physical disks on which the data exists. Over very short periods of time the entire set of disks can be changed. Movement of storage location is highly fluid as are the redundancy properties associated with any stored data.

Storage management functions are implemented within the network storage controllers themselves rather than in a centralized server attached to the network storage controllers. In other words, the logical constructs that represent the storage system are present in the memory of the network storage controller. Any authorized device that can access the network storage controller can therefore send management commands to, for example, create, modify, or destroy SCVDs 102, LDADs 103, and the like. This enables management to be implemented from arbitrary locations within the storage system itself.

The present invention is particularly described in terms of a set of algorithms embodied as firmware running on storage controller hardware. These mechanisms are used to create and present virtual storage devices, i.e., SCVDs 102, to an arbitrary set of hosts connected to the storage controller via a network connection such as a LAN, WAN, or connection directly to the storage area network (SAN) to which the physical storage devices are connected. Users request various operations via a graphical user interface (GUI) or command line interface (CLI) using a collection of public and private protocols.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for managing virtualized data storage, comprising:
   a virtualized logical disk object representing a virtual storage container, wherein the virtualized logical disk is an abstract representation of physical storage capacity provided by plurality of physical stores; and
   a virtual disk object representing a virtual storage container, wherein the virtual disk object is an abstract representation of one or mere virtualized logical disk objects, the virtual disk object including an exposed management interface; and
   wherein the virtual disk object is managed through the management interface to select the one or more logical disk objects represented by the virtual disk object.

2. The system of claim 1 further comprising:
   a derived disk object coupled to the logical disk object and including methods and data structures configured to add storage protocol to the logical disk object.

3. The system of claim 2 further comprising:
   a presented disk object coupled to the derived disk object and including methods and data structures configured to expose an virtual disk interface to selected clients.

4. The system of claim 1 further comprising:
   a network storage controller including a processor and memory, wherein the logical disk object and virtual disk object are implemented in memory of the network storage controller.

5. The system of claim 4 further comprising a set of persistent objects managed by the network storage controller, wherein the persistent objects represent hardware resources of the network storage system.

6. The system of claim 1, further comprising:
a physical store object representing a physical storage device; and
a volume object representing storage capacity that can be allocated from the storage device represented by the physical store object, wherein the volume object presents a logical abstraction of the physical store object.

7. The system of claim 1 further comprising:
a storage cell client object representing a host management agent, wherein the storage cell client object has an interface for coupling to the management interface.

8. The system of claim 1 wherein the storage cell client object is capable of representing a host management agent located in any network-coupled computing device.

9. A method for facilitating management of virtual storage in a storage area network enabling a user can flexibly present a virtual disk to a host, comprising:
connecting a host to a network storage controller (NSC) via a host agent capable of communicating command-response traffic with logical objects implemented in the network storage controller;
creating a logical disk object representing a virtual storage container, wherein the logical disk is an abstract representation of physical storage capacity provided by plurality of physical stores;
adding a storage protocol to the logical disk object using a derived disk object in response to a user protocol selection;
associating the derived object with a host using a presented disk object referencing the host agent response to a user host selection; and
creating a virtual disk object comprising the logical disk object, the derived disk object and the presented disk object.

10. The method of claim 9, further including providing the user protocol selection and the user host selection via a management console having a computer interface and communicating the user selections to the host agent.

11. A method for managing virtual storage in a storage area network, the method comprising:
providing at least one network storage controller coupled to a plurality of physical disk drives implementing physical storage capacity;
creating a physical store object representing each of the plurality of physical disk drives;
specifying at least some of the plurality of physical disk drives for inclusion in a storage cell;
verifying that sufficient physical store objects were specified to satisfy the requested device failure protection level before creating a storage cell object; and
creating the storage cell object representing the storage cell wherein the physical store objects corresponding to the specified physical disk drives are included in the created storage cell.

12. The method of claim 11 wherein the act of specifying comprises:
obtaining user specifications of a required failure protection level; and
obtaining user specifications of a set of physical disk drives.

13. The method of claim 12 further comprising creating a volume record on each of the physical disk drives included in the created storage cell.

14. The method of claim 11 further comprising creating a management logical disk object storing metadata describing the created storage cell object.

15. The method of claim 11 further comprising:
verifying that at least four physical store objects were specified before creating the storage cell object.

16. The method of claim 12 further comprising:
verifying that ports on the network storage controller are operational before creating the storage cell object.

17. The method of claim 12 further comprising:
verifying that all of the selected physical store objects are in an operational condition before creating the storage cell object.

* * * * *